(12) United States Patent
Moore et al.

(10) Patent No.: US 7,013,203 B2
(45) Date of Patent: Mar. 14, 2006

(54) WIND TURBINE SYSTEM CONTROL

(75) Inventors: Gary Moore, Calgary (CA); Mark Edward Cardinal, Altamont, NY (US)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 10/691,680

(22) Filed: Oct. 22, 2003

(65) Prior Publication Data

US 2005/0090937 A1    Apr. 28, 2005

(51) Int. Cl.
   *F03D 7/00*    (2006.01)
   *F03D 9/00*    (2006.01)
(52) U.S. Cl. .......................... 700/286; 290/44; 70/287
(58) Field of Classification Search ................ 700/286, 700/287; 702/3; 290/44; 361/62
   See application file for complete search history.

(56) References Cited

U.S. PATENT DOCUMENTS

| 2002/0029097 A1* | 3/2002 | Pionzio et al. ............... 700/286 |
| 2003/0102675 A1* | 6/2003 | Noethlichs .................... 290/44 |
| 2004/0230377 A1* | 11/2004 | Ghosh et al. ................... 702/3 |
| 2004/0264082 A1* | 12/2004 | Suliman et al. ............... 361/62 |

FOREIGN PATENT DOCUMENTS

| WO | WO 03/029648 | * | 4/2003 |
| WO | WO 03/077048 | * | 9/2003 |

OTHER PUBLICATIONS

G.J.Smith "SCADA in wind farms" Instrumentation in the Electrical Supply Industry, IEE Colloquim in London.UK, pp. 11/1-11/2, Jun. 1993.*
Business Wire "SWANTECH announces the SWANguard WTM-800 at WINDPOWER 2002; Product used for condition Monitoring of Wind Power Turbines" Jun. 26, 2002 p. 1.*

* cited by examiner

*Primary Examiner*—Jayprakash N. Gandhi
*Assistant Examiner*—Steven R. Garland
(74) *Attorney, Agent, or Firm*—Blakely, Sokoloff, Taylor & Zafman LLP

(57) ABSTRACT

Wind turbine generator wind farm systems to collect data for use for wind farm control. A combination master-slave supervisory command and data acquisition (SCADA) architecture together with distributed databases local to the data producing device within a wind farm provide functionality for real-time monitoring and control as well as secondary data processing and/or remote user access. The architecture facilitates approximately real-time monitoring and control of devices in the wind farm both locally and remotely while also facilitating reliable archiving of operational data of individual wind turbines as well as totalized wind farm data.

24 Claims, 4 Drawing Sheets

WIND TURBINE SYSTEM CONTROL

TECHNICAL FIELD

The invention relates to control of multiple wind turbine generators. More particularly, the invention relates to control and data acquisition in a wind farm having multiple wind turbine generators.

BACKGROUND

Historically, wind turbines have been very small contributors to overall power generation to supply electrical grids. The low unit ratings (<100 kW) and the uncertain availability of wind sources caused wind turbine generators affect negligible when power grid operators considered the security of the grid. However, wind turbine generators with ratings of 1.5 MW or more are now available. Furthermore, many power generation developers are installing wind farms having one hundred or more wind turbine generators. The "block" of power available from wind farms with 1.5 MW wind turbine generators is comparable to a modem gas turbine generator. Accordingly, wind turbine generators are increasingly feasible sources of power for the power grid.

One requirement for efficient power production in a wind farm is collection of data. Current data collection systems are typically based upon a continuously functioning single central data collection architecture with limited capability for intelligent processing and storage of data at each wind turbine, meteorological mast or at the substation. This type of architecture is susceptible to the central data collecting system failing to store and archive the data being produced by the devices in the wind farm if faults occur in the wind farm network infrastructure. For example, the loss of the connectivity between the supervisory command and data acquisition (SCADA) master device and wind turbines could result in loss of operational data and fault records from the wind turbines.

SUMMARY

A supervisory command and data acquisition (SCADA) system to manage a wind farm is described. The SCADA system includes a plurality of turbine communication servers (TCSs) within wind turbines of the wind farm. The TCSs collect data from the turbines, store a first subset of the data locally and transmit the first subset of data according to non-real-time intervals. The TCSs also transmit a second subset of data over a wind farm network to provide approximately real-time data and store the second subset of data until successfully transferred. The SCADA system further includes a server coupled to communicate with the plurality of TCSs to provide signals to control the wind turbines, the server being further to store data received from the plurality of TCSs and to perform database management on the received data.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
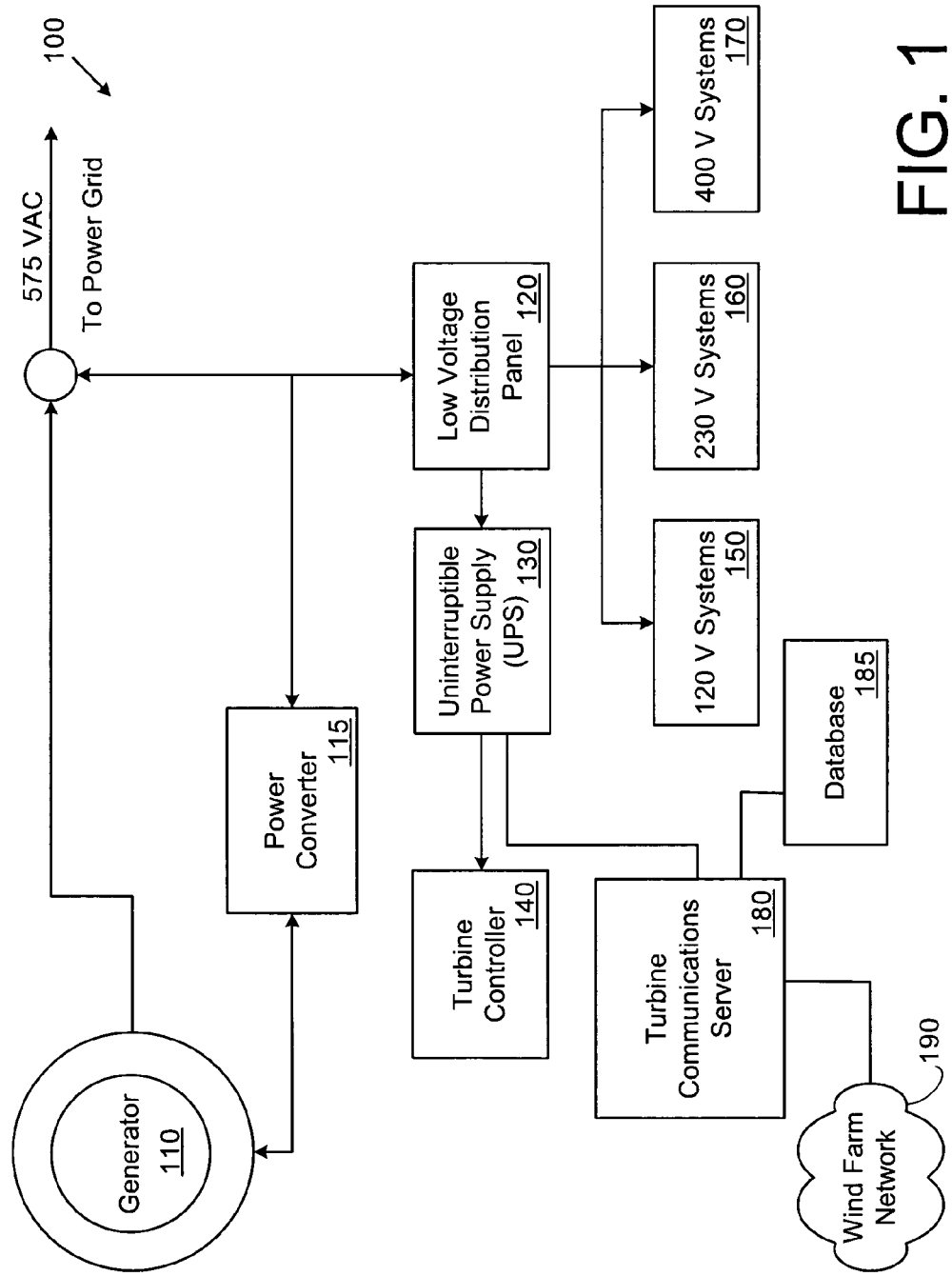
FIG. 1 is a block diagram of one embodiment of an electrical system of a wind turbine generator.

The techniques described herein allow a wind turbine generator wind farm systems to collect data for use, for example, for generator control. In one embodiment, a combination master-slave supervisory command and data acquisition (SCADA) architecture together with distributed databases local to the data producing device within a wind farm provide functionality for real-time monitoring and control as well as user visualization, historical data archiving and reporting, configuration management, secondary data processing, fault logging, alarming and/or remote user access. In one embodiment, the architecture provides approximately real-time monitoring and control of wind farm devices both locally and remotely while also facilitating archiving of operational data of individual wind turbines as well as totalized wind farm data.

In one embodiment, the architecture utilizes a client device within wind turbines, wind farm meteorological masts and/or wind farm substations to provide a communications interface (real-time and file transfer) between the devices and a wind farm local area network (LAN) or remote host. The architecture further provides real time data logging and processing, data historian, access to data via servers and database storage and management functionality. The system can use, for example, a real time, event driven database management system in each intelligent device and a host master station.

The system design can also support integration and a single user configuration interface for additional wind farm applications such as curtailment, power applications such as power factor control, condition monitoring systems and operational forecasting systems. In one embodiment, integrated into the system is a electric utility gateway that provides connectivity options to electric utility SCADA master stations using native protocols. This gateway can also include a database that allows multiple database partitioning and multiple independent master station capabilities. The master-slave architecture can also allow central single point of configuration for complex data management and communications system management.

Previous wind farm control architectures have been based upon a continuously functioning single central data collection architecture with limited capability for intelligent processing and storage of data at each wind turbine, meteorological mast and/or at the substation. This type of architecture was susceptible to the central data collecting system failing to store and archive the data being produced by the devices in the wind farm if faults occurred in the wind farm network infrastructure. For example, standard master slave architectures used in a wind farm and without a distributed SQL database within each wind turbine, the loss of the connectivity between the SCADA master and wind turbines, the wind farm LAN (Local Area Network) could result in loss of operational data and fault records from the wind turbine.

Being based upon a single central monitoring, control and central data collection architecture (i.e., single SCADA Master), previous systems could not support additional independent SCADA masters (i.e., SCADA devices within the various components of a wind farm, for example, wind turbines, substations and/or meteorological sites) and secondary databases within the wind farm, nor could these architectures support remote monitoring, control and data collection independent of the SCADA master.

FIG. 1 is a block diagram of one embodiment of an electrical system of a wind turbine generator. The example of FIG. 1 provides specific voltages that are typical for wind turbine generators in the 1.5 MW class for use in the United States. Other similar voltages can be used for 50 Hz wind turbine generators. In general, higher voltages are used for higher power ratings and lower voltages are used for lower power ratings. However, the overall architecture is applicable for many different types and sizes of wind turbines with the same and/or different voltages.

Generator 110 provides AC power to the power grid as well as to other components of wind turbine electrical system 100. In one embodiment, generator 110 provides 575 V (which is the rated voltage of the generator); however, any voltage can be provided. The power generated by generator 110 is provided to a wind farm substation or other facility for collecting power generated by multiple wind turbine generators. Generator 110 also provides power to power converter 115, which operates as described above with respect to FIG. 2, and to low voltage distribution panel (LVDP) 120.

In one embodiment, LVDP 120 includes a transformer to transform the 575 V power received from generator 110 to 120 V, 230 V and 400 V power for use throughout the wind turbine (120 V systems 150, 230 V systems 160 and 400 V systems 170, respectively). Other and/or additional power supply levels can be provided as desired. The wind turbine generator systems connected to LVDP 120 include, for example, the pitch system controls and motors, the yaw system controls and motors, various lubrication and cooling systems, electrical receptacles and lights, heaters and miscellaneous equipment.

In one embodiment, LVDP 120 provides power to turbine controller 140 through uninterruptible power supply (UPS) 130. UPS 130 provides power to turbine controller 140 in the event that LVDP 120 is unable to provide necessary power to turbine controller 140. UPS 130 can be any type of uninterruptible power supply, for example, a battery system, a photovoltaic system or any other power storage system known in the art. In one embodiment, UPS 130 does not have sufficient capacity to energize all of the electrical loads served by LVDP 120.

Turbine communications server (TCS) 180 is coupled to receive power from UPS 130. TCS 180 is also coupled with wind farm network 190 to provide data to a remote device, for example, a server device that interacts with multiple TCSs in a wind farm. TCS 180 is coupled with turbine controller 140 as well as other components (coupling not illustrated in FIG. 1 for reasons of simplicity) to provide control and data acquisition operations.

TCS 180 is further coupled with database 185, which stored data acquired from the components of wind turbine 100. In one embodiment, TCS 180 acquires real time and historical data from wind turbine controllers and other devices within wind turbine 100 using a real time interrupt driven database manager. TCS 180 also performs secondary data processing, alarming, configuration management and data compression, stores or archives data in a real time and historical database in database 185.

TCS 180 also serves real time data to single or multiple SCADA master using a real time SCADA protocol over wind farm network 190. TCS 180 further serves historical data to a central database using ODBC protocol and provides a user and configuration interface via an embedded browser. TCS 180 can either be an independent hardware device (e.g., a computer system or other electronic device) that interfaces and communicates with turbine controller 140 or the functionality of TCS 180 may be implemented in the turbine controller 140.

Figure 2:
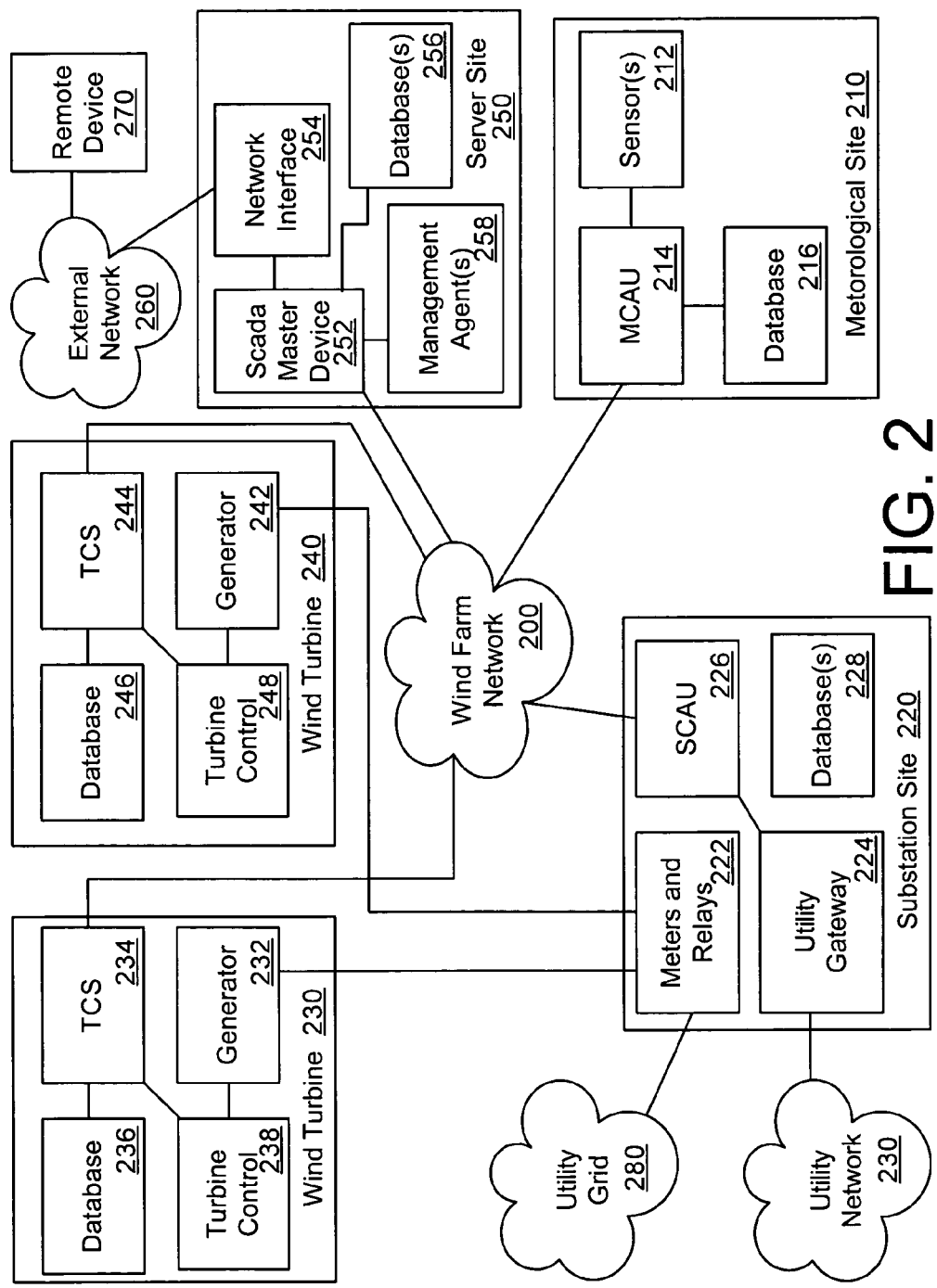
FIG. 2 is a block diagram of one embodiment of a wind farm.

FIG. 2 is a block diagram of one embodiment of a wind farm. The wind farm can include any number of wind turbines, meteorological sites, etc. The components of the wind farm are interconnected by wind farm network 200, which can be any type of network (e.g., local-area network, wide-area network, wired connections and/or wireless connections) known in the art using any network protocol (e.g., known in the art.

Meteorological site 210 generally includes one or more sensors 212, meteorological command and acquisition unit (MCAU) 214 and database 216. In one embodiment, meteorological site 210 includes a tower with multiple sensors 212 to gather meteorological data to be used in the control of the wind turbine generators of the wind farm. In one embodiment, the tower includes sensors to monitor horizontal wind speed and direction from at least four levels above the ground, vertical wind speed, temperature, and atmospheric pressure. In alternate embodiments, other sensor and/or tower configurations can be used.

In one embodiment, MCAU 214 is coupled with sensors 212 and database 216 and operates as a SCADA slave device. As described in greater detail below, MCAU 214 communicates with a SCADA master device to provide a control and data acquisition system for the wind farm. In one embodiment, MACU 214 operates as a real-time, event-driven data logging and processing device that causes acquired data to be stored in database 216. Data stored in database 216 can be maintained for an extended period for historical data archiving, reporting and/or other purposes.

In one embodiment, MCAU 214 includes a database manager that performs secondary data processing in addition to real-time, event-driven data logging. The secondary processing can include, for example, alarming, configuration management and/or data compression. In one embodiment, database 216 is a Structured Query Language (SQL) database; however, any database language and/or protocol can be used. Use of SQL databases in known in the art.

Data stored in database 216 is periodically transmitted to a server with an associated database over wind farm network 200. In one embodiment, the various databases interact via the Open Database Connectivity (ODBC) application program interface (API); however, other interfaces could also be used. Various versions of the ODBC Manager are available from Microsoft Corporation of Redmond, Washington.

Substation site 220 generally includes meters and relays 222, substation command and acquisition unit (SCAU) 226, database 228 and utility gateway 224. Utility gateway 224 provides an interface to an external network (utility network 280) that can be used, for example, by a utility company or other entity that controls a utility grid to communicate with components of the wind farm. Alternatively, utility gateway 224 can be located at a site other than substation site 220.

Meters and relays 222 can be any combination of meters and relays known in the art for use at a substation. Meters and relays 22 provide an interface between generators of the wind farm and utility grid 280 as well as monitoring functionality related to power delivery.

In one embodiment, SCAU 224 includes a database manager that performs real-time, event-driven data logging alarming, configuration management, data compression and/ or other data management functions. In one embodiment, database 228 is a SQL database; however, any database language and/or protocol can be used. Data stored in database 228 is periodically transmitted to a server with an associated database over wind farm network 200. In one embodiment, the various databases interact via the ODBC API; however, other interfaces could also be used.

The wind farm of FIG. 2 is illustrated with two wind turbines (230, 240) for reasons of simplicity of explanation. Wind farms can include any number of wind turbines that can be similar or different in design and/or power delivery.

Wind turbines 230 and 240 generally include turbine command and acquisition units (TCS) 234 and 244, databases 236 and 246 generators 232 and 242 and turbine controllers 238 and 248. Generators 232 and 242 are connected to a shaft of wind turbine 230 and 240, respectively and are driven by wind forces. Any generator known in the art suitable for wind turbine use can be used. Turbine controllers 238 and 248 are coupled with generators 232 and 242, respectively, and control the generators using any control techniques known in the art.

In one embodiment, TCSs 234 and 244 include database manager applications that perform real-time, event-driven data logging alarming, configuration management, data compression and/or other data management functions. In one embodiment, databases 236 and 246 are SQL databases; however, any database language and/or protocol can be used. Data stored in databases 236 and 246 is periodically transmitted to a server with an associated database over wind farm network 200. In one embodiment, the various databases interact via the ODBC API; however, other interfaces could also be used.

Server site 250 includes SCADA master device 252 that is coupled with wind farm network 200. SCADA master device 252 acquires real-time data from MCAU 214, SCAU 226, TCS 234 and TCS 244 using a real-time acquisition engine and provides operator interfaces, alarming, control interfaces, etc. SCADA master device 252 also acquires historical data from MCAU 214, SCAU 226, TCS 234 and TCS 244 (as stored in databases 216, 228, 236 and 246, respectively) using, for example, ODBC protocols.

SCADA master device 252 is also coupled with network database 256 that provides storage of data acquired by SCADA master device 252. Network interface 254 is coupled with SCADA master device 252 to provide an interface to external network 260. External network 260 can be any network external to the wind farm, for example, the Internet, or a corporate intranet. Remote device 270 is coupled with external network 260 and is configured to communicate with SCADA master device 252.

In one embodiment, use of a real time, event driven database management systems and SQL databases within each wind turbine, meteorological mast and/or substation provides that there is no loss of data that is being acquired from controllers, relays, meters and other intelligent electronic devices being used within the wind farm. In one embodiment, use of a distributed database together with secondary data processing functions provides capability for data compression and database management techniques within each wind turbine, meteorological mast and/or wind farm substation.

In one embodiment, use of a real time communication protocol together with a non-real-time LAN protocol between the SCADA master and the wind turbines assists in providing real time monitoring and control data is acquired independently from historical data from wind turbines, providing a system operator the ability to view near real time wind turbine status on an operator console and has prompt confirmation of wind turbine control actions that are initiated from the SCADA master. In one embodiment, the architecture also facilitates multiple independent master stations either within the wind farm and/or external to the wind farm.

While not illustrated in FIG. 2, a wind farm can be logically or physically divided into multiple "parks" that include one or more wind turbines. Data that is gathered can be processed and/or presented in terms of parks as well as the wind farm as a whole or individual wind turbines.

Figure 3:
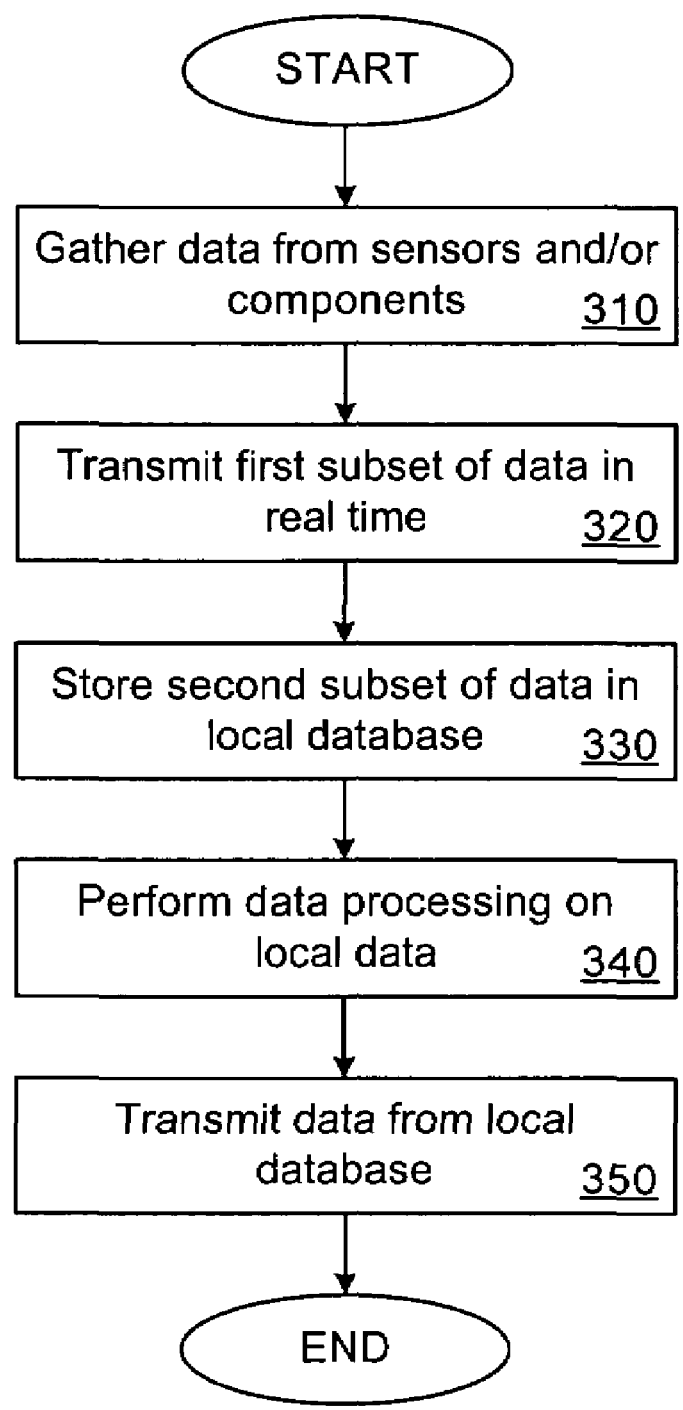
FIG. 3 is a flow diagram of one embodiment of data acquisition and processing by a wind turbine in a wind farm.

FIG. 3 is a flow diagram of one embodiment of data acquisition and processing by a wind turbine in a wind farm. Data is gathered from sensor and/or components of a wind farm device, 310. The wind farm device can be, for example, a wind turbine having a generator, a substation, or a meteorological site having a mast with various sensors.

The specific data gathered by the local SCADA master varies depending on the device in which it is included. For example, in a wind turbine, the following data can be gathered: wind turbine controller state, wind speed, energy levels, and/or alarms, etc. An another example, in a meteorological site the following data can be gathered: horizontal wind speed and/or direction and multiple elevations, vertical wind speed, temperature, and/or atmospheric pressure, etc.

A first subset of the data is transmitted in real time, 320. The data is transmitted to a server or other data collection device using a wind farm network or other communications medium. In one embodiment, the real-time data is transmitted using a SCADA protocol, which is known in the art; however, any protocol that allows for real-time transmission of data can be used. The data is maintained in the local database until successfully transmitted to the server.

A second subset of the data is stored in a local database, 330. In one embodiment, the local database is a historical SQL database; however, any database protocol as well as any type of information can be stored in the local database. In one embodiment, the device that gathers data at the wind farm device (e.g., wind turbine, meteorological site, substation) operates as a SCADA master device with respect to the wind farm device. The local SCADA master device operates as a slave device with respect to a wind farm SCADA master device, that can be located, for example, at a wind farm control location.

In one embodiment, the local databases each have capacity to store data locally for a time sufficient to bridge anticipated unavailability of a server to which the data will be transmitted. For example, data collected from a wind farm device can be stored for 48 hours while a server can store data in a database for two months. Other time periods can be used based on, for example, operating conditions, etc.

The local SCADA master can perform data processing on the data stored in the local database, 340. Data from the local database is transmitted over the wind farm network, 350. The data that is stored in the local database until transmitted to the server. The data can be transmitted at the end of predetermined periods of time, in response to requests from the server or in response to predetermined conditions.

In one embodiment, data is transmitted from local SCADA masters at a relatively high degree of time resolution (e.g., approximately real time, each second, each two seconds, or at a sub-second resolution) and at a relatively low degree of time resolution (e.g., several seconds, minutes). For a wind turbine, data gathered at the relatively high degree of time resolution can include, for example, real power production, reactive power production, wind speed, energy subtotal, total energy gathered, etc. Wind turbine data can further include generator rotational speed, generator temperature, gearbox temperature, ambient temperature, wind direction, power factor phase voltage and phase current for each phase, production time, etc.

For a meteorological site, the data gathered at a relatively high degree of time resolution can be vertical and horizontal wind speeds, wind direction, temperature and air pressure. For a substation, the data gathered can include total active energy our from the substation, total reactive energy out from the substation, total active energy into the substation, total reactive energy into the substation, etc. Additional and/or different data can also be gathered.

Figure 4:
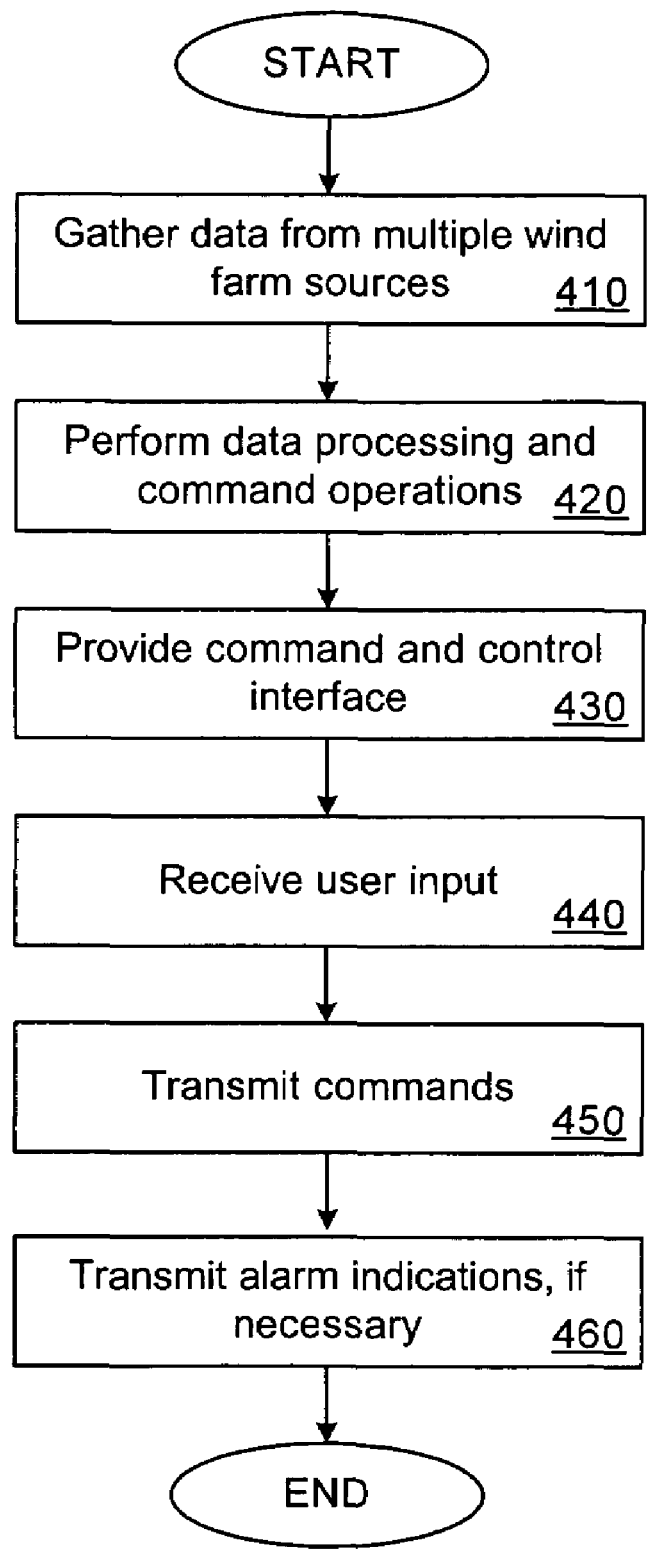
FIG. 4 is a flow diagram of one embodiment of data acquisition and processing by a server coupled to multiple wind turbines, substations and/or meteorological sites in a wind farm.

FIG. 4 is a flow diagram of one embodiment of data acquisition and processing by a server coupled to multiple wind turbines, substations and/or meteorological sites in a wind farm. Data is received from the wind farm devices, 410. Real-time data is received on a continuous basis as the data is provided by the wind turbines, substations, meteorological sites, etc. As mentioned above, the real-time data can be received using a SCADA protocol, or any other appropriate protocol. Data is also gathered periodically as described above.

The data received by the server is processed and command operations can be issued, 420. Processing of the data can be performed in any manner known in the art. The commands issued by the server, or other device coupled with the server, can be used to control individual wind turbines, groups of wind turbines, as well as other devices coupled to the wind farm network.

The server, or a workstation coupled with the server, provides the data received via a command and control interface, 430. In one embodiment, the interface is a graphical user interface (GUI); however, any type of user interface can be provided. The interface can be used to receive user input, 440, as well as to provide data to a user. Commands to one or more wind farm components can be generated based on the user input. The commands are transmitted to one or more target devices, 450, over the wind farm network.

The server, or a workstation or other device coupled with the server, can provide data processing including generation of alarms based on the received data. Alarm indications, if generated, can be transmitted to remote devices and/or displayed via the user interface, 460. The device(s) to which alarms are transmitted can communicate via the wind farm network or via a network external to the wind farm network.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A supervisory command and data acquisition (SCADA) system to manage a wind farm comprising:
    a plurality of turbine communication servers (TCSs) within wind turbines of the wind farm to collect data from the turbines and to store a first subset of the data locally and to transmit the first subset of data according to non-real-time intervals and to transmit a second subset of data over a wind farm network to provide approximately real-time data, wherein the second subset of data is stored until successfully transferred; and
    a server coupled to communicate with the plurality of TCSs to provide signals to control the wind turbines, the server being further to store data received from the plurality of TCSs and to perform database management on the received data.

2. The system of claim 1 wherein the non-real-time intervals comprise one of: a predetermined time interval, in response to a request from the server, or occurrence of a predetermined set of conditions.

3. The system of claim 1 further comprising a substation command and acquisition unit (SCAU) located at a substation and coupled with the server to collect data from the substation and to store a first subset of the data locally and to transmit the first subset of data according to non-real-time intervals and to transmit a second subset of data over the wind farm network to provide approximately real-time data, wherein the second subset of data is stored until successfully transferred.

4. The system of claim 3 further comprising a meteorological command and acquisition unit (MCAU) located a meteorological site to collect meteorological data from sensors at the meteorological site to transmit a first subset of meteorological data according to non-real-time intervals and to transmit a second subset of meteorological data over the wind farm network to provide approximately real-time data, wherein the second subset of data is stored until successfully transferred.

5. The system of claim 4, wherein the meteorological site has a meteorology tower with sensors to monitor horizontal wind speed and direction from at least four levels above the ground, vertical wind speed, temperature, and atmospheric pressure.

6. The system of claim 5, wherein the MCAU comprises a computer system running a general purpose operating system, and further wherein the MCAU executes a client application providing local data collection and site control.

7. The system of claim 4, wherein one or more of the TCSs are configured to provide a connection for a portable device to allow a user of the portable device to communicate with one or more of the plurality of TCSs, the MCAU and/or the SCAU.

8. The system of claim 1 wherein the first subset of data is transmitted according to a first protocol and the second subset of data is transmitted according to a second protocol.

9. The system of claim 1, further comprising a graphical user interface (GUI) that can be accessed through a connection to one of the plurality of TCSs, a meteorological command and acquisition unit (MCAU) and/or a substation command and acquisition unit (SCAU).

10. The system of claim 9, wherein the user interface provides views to of the plurality of TCSs, the MCAU and/or the SCAU to allow users access to real time data and subsystem controls.

11. The system of claim 1, wherein one or more of the plurality of TCSs is configured to store data locally for a period of time sufficient to bridge anticipated unavailability of the server.

12. The system of claim 1, wherein one or more of the plurality of TCSs is configured to collect data including wind turbine controller state, wind speed, energy levels, and alarms.

13. The system of claim 1, wherein one or more of the plurality of TCSs comprises a computer system runmng a general purpose operating system, and further wherein each of the one or more TCSs executes an application providing local data collection and site control.

14. A system for managing a wind farm having a plurality of wind turbines comprising:

a Supervisory Command and Data Acquisition (SCADA) element at each wind turbine to collect data from the respective wind turbine and to store a first subset of the data locally and to transmit the first subset of data according to non-real-time intervals and to transmit a second subset of data over a wind farm network to provide approximately real-time data, wherein the second subset of data is stored until successfully transferred;

a SCADA element at each of one or more meteorological sites to collect meteorological data;

a SCADA element at each of one or more substations electrically connected with the plurality of wind turbines; and a server coupled to communicate with the wind turbine, meteorological, and substation SCADA elements via the wind farm network to receive and to store data received from the elements at predetermined intervals and to perform database management on the received data, the server further to gather and maintain current and historical data as to inputs, operating conditions, and outputs of the plurality of wind turbines.

15. The system of claim 14, wherein the gathered data comprises wind speed and energy production gathered from each wind turbine according to a first predetermined interval, meteorological data gathered from each meteorological site according to a second predetermined interval and substation data including power production corresponding to each substation.

16. The system of claim 15, wherein the gathered data comprises controller state gathered from each wind turbine, vertical and horizontal wind speeds, wind direction, temperature, and air pressure, total active energy out from a substation, total reactive energy out from a substation, total active energy into a substation, and total reactive energy into a substation.

17. The system of claim 14, wherein the gathered data comprises power, reactive power, wind speed, energy subtotal, and total energy data gathered according to a first time interval.

18. The system of claim 17, wherein the gathered data further comprises generator rotational speed, generator temperature, gearbox temperature, ambient temperature, wind speed, wind direction, real power, reactive power, power factor, phase voltage and phase current for each phase, energy production, and production time.

19. The system of claim 14, wherein the wind farm is organized into parks for reporting and management purposes and the gathered data comprises energy produced by each park.

20. The system of claim 19, wherein the data for each park comprises one or more of: an operational status of one or more turbines in the park, total real power produced in the park, total reactive power produced in the park, and a power factor for the park.

21. The system of claim 14, further comprising a configuration database for the wind farm to store information describing a current configuration of systems elements to be used during system initialization comprising information describing a current configuration of the wind farm including the wind turbine SCADA elements in the wind farm.

22. The system of claim 21, the configuration information further comprising: information describing each wind turbine of the wind farm, including for each such turbine data source information describing how source data from the turbine is to be mapped to fields in a system database.

23. The system of claim 14, further comprising processing logic to process wind turbine data to report one or more of: average power production over a time window, expected power production over the time window, and production efficiency over the time window for each wind turbine in the wind farm.

24. The system of claim 14, wherein the wind farm is organized into parks and the system further comprises processing logic to process wind turbine data to report one or more of: average power production over a time window, expected power production over the time window, and/or production efficiency over the time window for each wind turbine in each park.

* * * * *